United States Patent [19]

Miller et al.

[11] Patent Number: 4,488,480
[45] Date of Patent: Dec. 18, 1984

[54] CONTINUOUS COOKING DEVICE

[76] Inventors: Dye O. Miller, 1815 Pheasant Trail, Mount Prospect, Ill. 60056; August J. Antunes, 143 E. Jackson St., Elmhurst, Ill. 60126; Jerome Antunes, 21 Clubside Dr., Clarendon Hills, Ill. 60514

[21] Appl. No.: 434,347

[22] Filed: Oct. 14, 1982

[51] Int. Cl.³ .............................................. A47J 37/00
[52] U.S. Cl. ...................................... 99/386; 99/349; 99/390; 99/443 C; 198/814
[58] Field of Search .................. 99/386, 389, 390, 391, 99/443 C, 349; 198/851, 814

[56] References Cited

U.S. PATENT DOCUMENTS

| 1,694,746 | 12/1928 | Landahl | 198/851 |
| 1,832,831 | 11/1931 | Ginder | 99/390 |
| 1,948,739 | 2/1934 | Wolcott et al. | 99/390 |
| 3,295,434 | 1/1967 | Wilhelm et al. | 99/386 |
| 3,425,341 | 2/1969 | McGinley | 99/423 |
| 3,517,605 | 6/1970 | Hursch et al. | 99/386 X |
| 3,520,249 | 7/1970 | Miller, Jr. | 99/386 X |
| 3,611,913 | 10/1971 | McGinley | 99/386 X |
| 3,693,452 | 9/1972 | McGinley et al. | 99/386 |
| 3,739,712 | 6/1973 | Duning | 99/386 X |
| 4,195,725 | 4/1980 | Jones | 198/814 X |
| 4,261,257 | 4/1981 | Henderson et al. | 99/386 |

FOREIGN PATENT DOCUMENTS

| 314741 | 7/1929 | United Kingdom | 99/390 |
| 742092 | 12/1955 | United Kingdom | 198/814 |

Primary Examiner—Billy J. Wilhite
Assistant Examiner—Christine A. Peterson
Attorney, Agent, or Firm—McDermott, Will & Emery

[57] ABSTRACT

A continuous cooking device includes a housing with an inlet and an outlet defined therein and an intermediate conveyor for conveying food products to be cooked from the inlet to the outlet through a cooking chamber including heating apparatus. The heating apparatus may include a pair of heating elements, one of the heating elements mounted on a door pivotal towards and away from the housing to open the cooking chamber for user access. Electrical connection to the door mounted cooking element may be provided by a hollow shaft that secures the door to the housing and provides a passageway for an electrical conductor. The conveyor is advantageously a belt conveyor made up of a plurality of removeably interconnected links separatable to facilitate cleaning. A second cooking element may be located on the opposite side of the conveyor from the door mounted cooking element, arranged in juxtaposition with the conveyor to define a food product passageway between the second cooking element and the conveyor. Since the position of the adjacent portion of the conveyor may be adjusted with respect to the second cooking element, a variably sized passageway is defined. The belt conveyor provides a slight contact pressure, pressing the food products against the second cooking element. The housing inlet may include an upstanding inclined guide element that is removably positionable atop the housing. The element also serves to secure a replaceable protective sheet over the second cooking element to protect the surface thereof.

1 Claim, 10 Drawing Figures

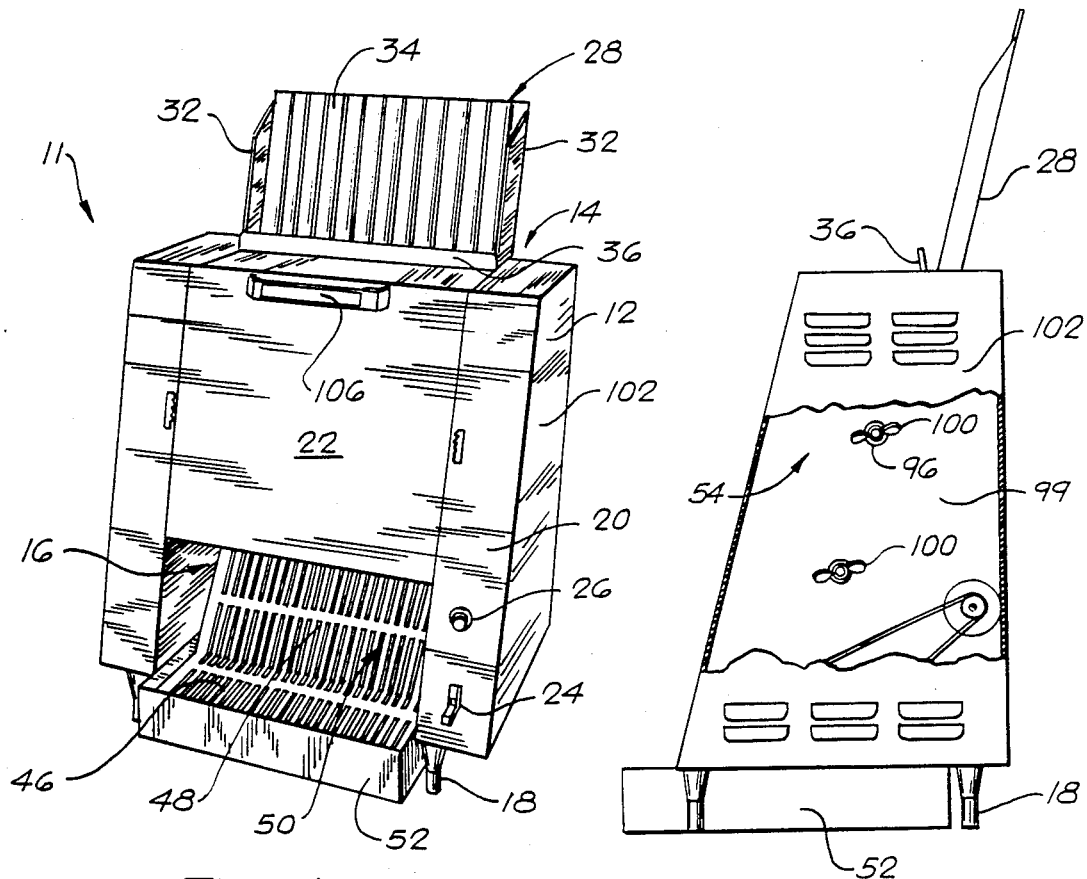
FIG. 1
FIG. 2
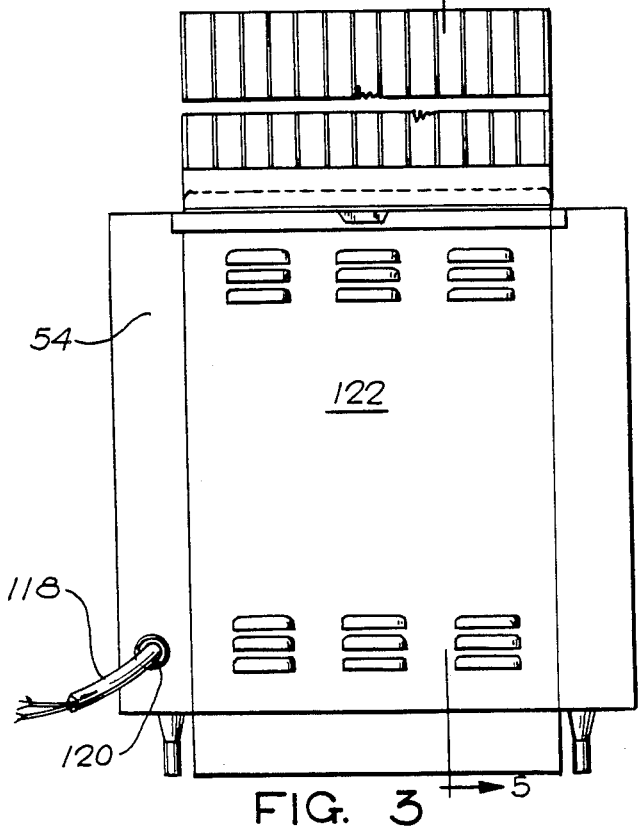
FIG. 3
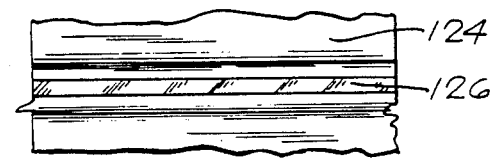
FIG. 8
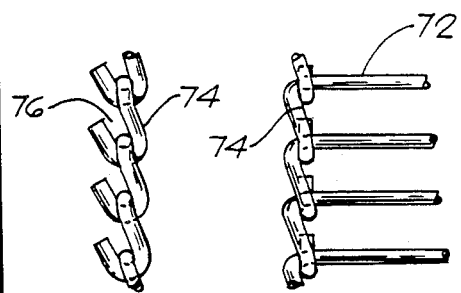
FIG. 9    FIG. 10

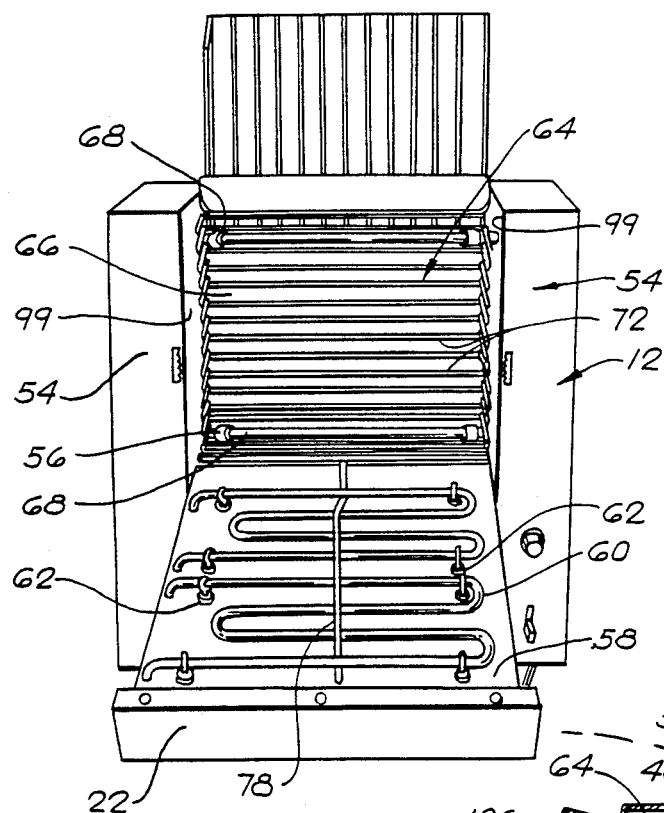
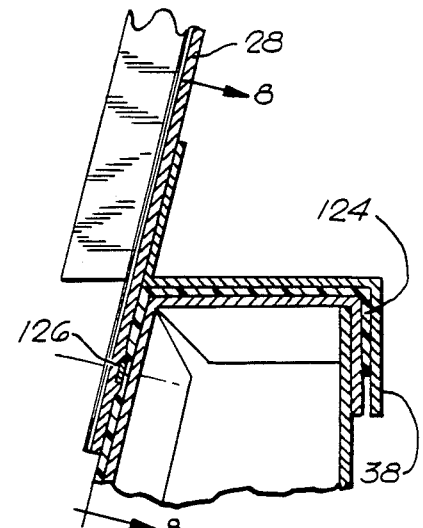
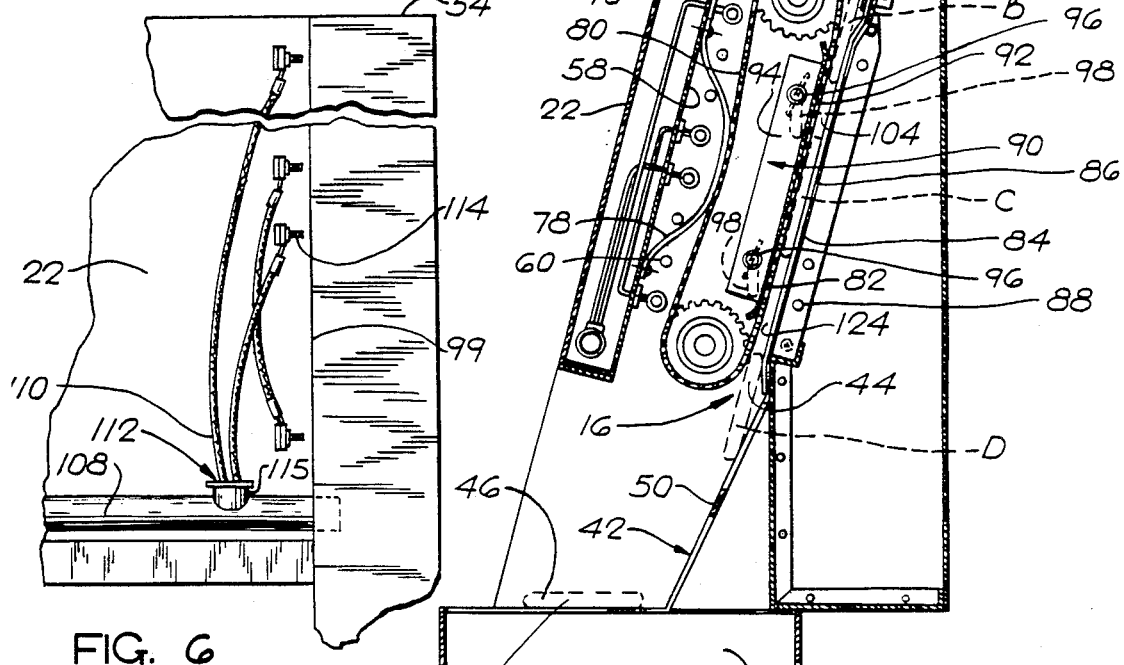

CONTINUOUS COOKING DEVICE

BACKGROUND OF THE INVENTION

1. Field of the Invention

The present invention relates generally to continuous, automated commercial cooking devices and particularly to such a device applicable to cooking meat products such as hamburgers or the like.

2. Brief Description of the Background Art

A number of cooking devices are known in the art which provide automated food item cooking through the use of a heating element and juxtapositioned belt conveyor. The belt conveyor is made up of a plurality of interlinked rods or links which together define a food item conveying surface. The rotation of the conveyor belt conveys the food items from an inlet to an outlet adjacent the heating element. Such devices have been successfully used in the toasting of buns and the like as disclosed in U.S. Pat. Nos. 3,611,913, 3,517,605, 3,589,274, and 3,520,249. U.S. Pat. No. 3,611,913 to McGinley, for example, discloses an adjustably positionable belt conveyor that defines an inclined food cooking passageway between itself and an adjacent cooking element. U.S. Pat. No. 3,520,249 to Miller discloses a toaster with a belt type conveyor that uses a protective sheet for covering the heating element.

Continuous cookers are also known to be useful in cooking meat products such as hamburgers. U.S. Pat. No. 3,693,452 to McGinley et al. discloses a hamburger broiler and grill with a belt conveyor that presses hamburgers against a first grill and conveys them past a spaced broiler, so that the hamburgers are both broiled and grilled. U.S. Pat. No. 3,425,341 to McGinley discloses a hamburger broiler with a pivotally mounted cover. U.S. Pat. No. 3,739,712 to Duning discloses still another apparatus of this general type useful for cooking hamburgers or the like.

While continuous cookers have considerable utility in the field of automated food item cooking, there is a continuing demand for still greater improvements in this area. Particularly the mechanical complexity of these devices has greatly increased the difficulty in maintaining their cleanliness. The various cooking elements and conveyors make access to the various parts extremely difficult so that cleaning is a very cumbersome task.

SUMMARY OF THE INVENTION

It is the primary object of the present invention to provide a continuous conveyor cooker which facilitates its own cleaning.

It is an object of the present invention to provide such a device including an openable door, mounting a first cooking element so as to allow access to the interior cooking chamber.

It is yet another object of the present invention to provide such a device including means for safely and effectively providing electrical power to the door.

It is also an object of the present invention to provide a cooking device of this general type including an inlet guide that also functions to secure a protective sheet over a second cooking element.

These and other objects of the present invention are achieved by an automated cooking device for cooking meat products that includes a housing with an upper inlet means for receiving the meat products into the housing and a lower outlet means for outputting the meat products from the housing. An endless chain conveyor mounted within the housing is arranged to convey the meat products from the inlet means to the outlet means. The conveyor includes opposed first and second sides. The first cooking means mounted in the housing adjacent to the first side of the conveyor generates heat to cook meat products as the meat products are conveyed from the inlet means to the outlet means. The second cooking means also mounted on the housing adjacent the second side of the conveyor generates heat to cook the meat products as the meat products are conveyed from the inlet means to the outlet means. A door means mounted on the housing for movement away from the housing allows access to the interior of the housing. The first cooking means is mounted on the door means. A chain conveyor includes a plurality of connected chain links defining a meat product conveying surface. At least two adjacent links are disassembleable to enable the conveyor to be removed from the housing, allowing access to the second cooking means.

In accordance with another preferred embodiment of the present invention a food cooking device includes a housing defining an internal cooking chamber. A door pivotally mounted on the housing is arranged to allow access to the cooking chamber. An electrical heating element for producing heat in the cooking chamber is electrically connectable to an electrical potential source. A hollow pivot bar mounted in the housing pivotally connects the door to the housing. The bar includes an internal electrical conductor and the heating element is electrically connected to the potential source by way of the electrical conductor.

In accordance with still another preferred embodiment of the present invention an automated food products cooking device includes a housing with an upper inlet means for receiving the food products into the housing and a lower outlet means for outputting the food products from the housing. A heating surface for cooking food products is mounted in the housing between the inlet means and the outlet means. Conveying means conveys food products from the inlet means to the outlet means to be cooked by the heating surface. A guide means is mounted on the housing at the inlet means. The guide means includes a guide element arranged to guide the food products into the inlet means. The guide element is removeably positionable on the housing and includes means for securing a replaceable protective sheet over the heating surface.

BRIEF DESCRIPTION OF THE DRAWING

FIG. 1 is a perspective view of one embodiment of the present invention;

FIG. 2 is a partially cut-away, side elevation view of the embodiment shown in FIG. 1;

FIG. 3 is a rear elevational view of the embodiment shown in FIG. 1;

FIG. 4 is a front perspective view of the embodiment shown in FIG. 1 with its door in its open position;

FIG. 5 is an enlarged cross-sectional view taken generally along the line 5—5 in FIG. 3;

FIG. 6 is a partial, cut-away, enlarged view of the portion adjacent the pivot bar in the embodiment shown in FIG. 1;

FIG. 7 is an enlarged, partial, cross-sectional view of the portion adjacent the guide element, shown in FIG. 5;

FIG. 8 is a partial cross-sectional view taken generally along the line 8—8 in FIG. 7, with the guide element removed;

FIG. 9 is an enlarged, side elevational view of the conveyor chain shown in FIG. 5; and FIG. 10 is an enlarged, front elevational view of the front of the chain shown in FIG. 9.

DESCRIPTION OF THE PREFERRED EMBODIMENT

Referring to the drawing wherein like reference characters are used for like parts throughout the several views, a continuous cooking apparatus 11 includes a broadly trapezoidal housing 12 defining a food inlet 14 and a food outlet 16. A substantial portion of the apparatus 11 is supported in a position spaced from a supporting surface through the operation of the legs 18. The inclined front face 20 of the housing 12 includes a pivotally openable door 22 pivotal about its bottom around a generally horizontal axis. The front face 20 also includes an on/off switch 24 and a cooking speed control 26.

The food inlet 14 includes a rearwardly inclined, upwardly extending guide 28 that directs food items into the inlet opening 30. The guide 28 includes a pair of lateral guards 32 which extend forwardly away from the guide 28 and a plurality of vertically aligned ridges 34 which further help to guide the food items into the elongated inlet opening 30. In addition, a forwardly and slightly upwardly extending flap 36 extends along the length of the forward edge of inlet opening 30 to further funnel food items into the inlet opening 30. As best seen in FIGS. 5 and 7, the guide 28 is removeably positionable atop the housing 12. Particularly the guide includes a generally U-shaped base 38 that conforms to a portion of the upper surface 40 of the housing 12.

The food outlet 16 includes a generally L-shaped collection bin 42 communicating with the outlet opening 44 of the housing 12. The collection bin 42 includes a generally horizontally arranged collection portion 46 marked by a plurality of slots 48 that provide for grease drainage from the cooked food products. In addition, the collection bin 42 includes an upwardly and rearwardly inclined slide portion 50 positioned directly below the outlet opening 44 and also including slots 48 to facilitate the drainage of grease. The collection bin 42 is removably held within a generally open-topped rectangular container 52, that rests on the supporting surface and serves as a grease receptacle. Both the container 52 and collection bin 42 may be slid forwardly away from the rest of the housing 12 to facilitate cleaning and the disposal of waste grease.

Referring now to FIG. 4, the housing 12 includes a pair of lateral chambers 54 positioned to either side of a central cooking chamber 56. The cooking chamber 56 is positioned directly behind the pivotally openable door 22 so that access to the cooking chamber 56 may be gained by pivoting the door 22 away from the rest of the housing 12. The inside surface 58 of the door 22 includes a first heating element 60, conveniently an electrically powered resistance coil type of heating element secured by fasteners 62 in a slightly spaced arrangement with respect to the door 22.

An upright, flexible, endless belt conveyor 64 is situated generally centrally within the cooking chamber 56. The conveyor 64 includes an endless belt 66 mounted for rotation on a pair of spaced axles 68. Each axle carries a pair of spaced gears 70 that engage the endless belt 66. The belt 66 is made up of a plurality of links or rods 72 arranged predominantly in a generally horizontal configuration. However, the end of each link 72 is marked by a hook portion 74 which extends generally transversely away from the remainder of the link 72. The hook portion 74, as best shown in FIGS. 9 and 10, engages and encircles an adjacent link 72 to interconnect the links 72 in a chain. Each hooked portion 74 defines an open gap 76 to enable free disconnection of adjacent links 72. The maintenance of the connection between the links 72 is made possible by tensioning the belt 66, conveniently through the operation of a bowed, U-shaped leaf spring 78 that extends rearwardly away from, but is attached to, the inside surface 58 of the door 22.

The arrangement of the conveyor 64 within the housing 12 defines a pair of opposed conveyor sides 80 and 82 formed from the unsupported portions of the belt 66. With the door 22 in its closed position, shown in FIG. 5, the first heating element 60 is positioned adjacent the front side 80 of the conveyor 64. Positioned along and situated generally parallel to the rear side 82, a second heating element 84 includes a heating surface 86. The illustrated heating element 84 is conveniently an electrical heating element with embedded heating rods 88. The rods 88 heat the heating surface 86 that is arranged to face generally forwardly in an inclined configuration, aligned directly beneath the food inlet 14, and spaced slightly from the rear side 82 of the conveyor 64.

The spacing between the rear side 82 of the conveyor 64 and the heating surface 86 can be adjusted through the operation of the belt flexer 90. The belt flexer 90 includes an elongate guide 92 which extends generally along the rear side 82 of the belt 66, positioned within the interior of the conveyor 64. A bracket 94 extends forwardly away from the guide 92 and is punctuated by a pair of spaced, generally horizontally arranged rods 96. The rods 96 extend completely across the housing 12 and exit into the lateral chambers 54 through oblong slots 98 in the walls 99 separating the chambers 54 and 56, as indicated in FIG. 2. The positioning of the rods 96 within their respective oblong slots 98 may be adjusted by the fastener 100 which threads onto the ends of the rods 96 so as to fix them in a desired position along the slot 98. The fasteners 100 may be accessed by removing the side panels 102 which cover and close the lateral chambers 54. By varying the position of the rods 96 within their slots 98, the amount of outward flexing applied to the conveyor belt 66 through the guide 92 may be adjusted. In this way the passageway 104 defined between the heating surface 86 and the adjacent portion of the belt 66 can be varied in a convenient fashion.

Since the door 22 may be pivoted away from the rest of the housing 12 by merely pulling outwardly on the door handle 106, the possibility of damage to the electrical conductor supplying electrical potential to the first heating element 60 is avoided through the arrangement of the pivot bar 108, as shown in FIG. 4. Specifically the door 22 is mounted on the pivot bar 108 for rotation with respect thereto while the pivot bar 108 is fixed within the housing 12 walls 99 to extend into each lateral chamber 54. An electrical conductor 110 feeds from one lateral chamber 54 into the hollow interior of the pivot bar 108 and exits through the opening 112 located intermediately along the length of the pivot bar 108. The conductor 110 may then be passed upwardly into the interior of the door 22 to make appropriate electrical connections with the first heating element 60 as indicated at 114. A transverse ring 115 guides the entry of the conductor 110 into the door 22. In the lateral chamber 54, the appropriate connections to a source of potential may be made and appropriate feeds provided for powering the second heating element 84 and the motor 116 which drives the conveyor 64. An electrical cord 118 then feeds through an opening 120 on the rear surface 122 of the housing 12 to connect with an appropriate wall outlet (not shown). In this manner, the pivoting action of the door 22 does not endanger the integrity of the electrical conductor 110 and the possibility of creating short circuit is lessened.

A protective sheet 124 may be positioned over the heating element 84 to maintain the element 84 in a clean condition. The sheet 124 is hung by threading it under a strip 126 and then positioning the guide 28 over the sheet 124 and strip 126, as shown in FIGS. 7 and 8.

The apparatus 11 may be operated generally in the following manner. Initially the user operates the on/off switch 24 to turn the apparatus 11 "on" by connecting an appropriate source of electrical potential. A desired speed of operation of the conveyor 64 is then set using a cooking speed control 26 to adjust the cook time in accordance with the desired "doneness." Any items desired to be cooked, such as hamburgers and the like, are then inserted into the food inlet 14 by sliding them along the upstanding guide 28, as indicated at "A" in FIG. 5. The guide 28 together with the flap 36 conveys the food items through the inlet opening 30. Advantageously the food items are initially frozen so that they are easily fed into the opening 30. The food items then contact the upper edge of the endless belt 66, as indicated at "B" in FIG. 5, and are pulled downwardly into the passageway 104. The width of the passageway 104 may be adjusted by varying the position of the rods 96 within the oblong slots 98 in accordance with the thickness of the food items being cooked. This is accomplished simply by initially loosening the fastener 100, positioning the rods 96 in the desired position and thereafter refastening the fastener 100.

As the food items are conveyed along the passageway 104, as indicated at "C" in FIG. 5, they are simultaneously broiled and grilled. Grilling occurs on one side of the food item due to the forcing of the food item against the heating surface 86 of the second heating element 84. Simultaneously broiling occurs through the operation of the first heating element 60 which provides for spaced, convective heat transfer. When cooking is complete the food items pass onto the collection bin 42 initially sliding along the slide portion 50, as indicated at "D" in FIG. 5, and thereafter collecting on the portion 46, as indicated at "E" in FIG. 5. The slots 48 facilitate the drainage of grease.

The construction of the present invention advantageously simplifies and facilitates the cleaning of the apparatus 11. Specifically the door 22 may be pivoted open, as indicated in FIG. 4, to allow access to the inside surface of the door 22 including the first heating element 60 and the conveyor 64. With the tension removed from the conveyor 64 due to the pivoting away of the spring 78, a pair of adjacent links 72 may be separated to allow removal of the belt 66. Upon removal the belt 66 may be totally separated into individual links 72 to facilitate cleaning. With the conveyor 64 removed, easy access to the second heating element 84 is gained. In addition, the cleanliness of the second heating element 84 is encouraged through the use of a flexible protective sheet 124 which extends downwardly from the guide 28 and provides a replaceable protective covering over the heating element 84. Similarly the collection bin 42 may be removed from the device for separate cleaning and the collection bin container 52 can likewise be removed for cleaning. In this way the device 11 is very simply disassemblable for thorough cleaning.

While the present invention has been described with respect to a single preferred embodiment, those skilled in the art will appreciate a number of modifications and it is intended to cover within the appended claims all such modifications as come within the true spirit and scope of the present invention.

What is claimed and desired to be secured by Letters Patent of the United States is:

1. An automated cooking device for simultaneously broiling and grilling meat products such as hamburgers or the like, said device comprising:

a housing defining a generally vertical path of travel for said meat products;

an upper inlet means including a top opening in said housing and an upwardly and rearwardly extending inlet guide means for directing said meat products into said opening, said inlet guide means being substantially longer in the feed direction than said meat products to permit the stacking thereof of a plurality of said meat products for cooking;

a lower outlet means generally at the bottom of said housing including a storage area adjacent thereto for receiving and accumulating cooked meat products;

an endless belt chain conveyor, mounted within said housing and arranged to convey said meat products from said inlet means to said outlet means, said conveyor having opposed first and second sides;

a first radiant cooking means mounted within said housing adjacent to the first side of said conveyor for generating radiant heat to broil one side of said meat product as they are conveyed from said inlet means to said outlet means;

a second contact cooking means, mounted in said housing adjacent the second side of said conveyor for contacting and grilling said meat products on the side opposite the broiled side thereof as the meat products are conveyed from said inlet means to said outlet means;

a door mounted on said housing for pivotal movement toward and away from said conveyor permitting access to the interior of said housing, said first radiant cooking means being mounted on said door thereby defining a heating compartment between said first and second cooking means, said conveyor being mounted wholly within said heating compartment;

door mounting means mounted on said housing for pivotally connecting said door to said housing, and including a hollow pivot bar having a pair of open ends and being supported in said housing at a position spaced intermediate said ends and an electrical connector fed through one of said open ends into said bar and out of said bar at a position intermediate said ends to electrically connect said first radiant cooking means to a suitable power supply;

spring means for tensioning said endless belt conveyor mounted on said door for engaging said endless belt conveyor when the door is closed and maintaining a predetermined tension therein; and adjustable guide means mounted on the housing adjacent the endless belt chain conveyor to permit the size of the passageway between said conveyor and said second contact cooking means to be adjusted.

* * * * *